United States Patent [19]

Kadouchi et al.

[11] Patent Number: 5,652,500
[45] Date of Patent: Jul. 29, 1997

[54] CHARGE CONTROL APPARATUS FOR BATTERY PACK WHICH USES RATE OF CHANGE OF BATTERY TEMPERATURE ADJUSTED BY CORRECTION FACTOR

[75] Inventors: Eiji Kadouchi, Hirakata; Yuichi Watanabe, Tokyo-to; Megumi Kinoshita, Fujisawa; Noboru Ito, Kadoma; Kanji Takata, Neyagawa, all of Japan

[73] Assignee: Matsushita Electric Industrial Co., Ltd., Osaka, Japan

[21] Appl. No.: 554,116

[22] Filed: Nov. 6, 1995

[30] Foreign Application Priority Data

Nov. 8, 1994 [JP] Japan ................. 6-273422

[51] Int. Cl.⁶ .................. H01M 10/46; H02J 7/24
[52] U.S. Cl. .................. 320/15; 320/35
[58] Field of Search .................. 320/6, 15, 31, 320/35, 36

[56] References Cited

U.S. PATENT DOCUMENTS 5,252,906  10/1993  Busson ........................ 320/35 X
5,477,127  12/1995  Shiojima et al. ............... 320/35
5,492,199   2/1996  Koenck et al. ................ 320/35

*Primary Examiner*—Edward Tso
*Attorney, Agent, or Firm*—Panitch Schwarze Jacobs & Nadel, P.C.

[57] ABSTRACT

A battery pack is charged while being cooled by passing forced air therethrough. During charging, battery temperature and air temperature of air exhausted from the battery modules by the forced air cooling process are measured, and the difference between the battery temperature and the air temperature is calculated. The difference is added to an amount of change of the battery temperature per unit time to obtain a rate of change of battery temperature. When the rate of change exceeds a predetermined value, charging of the battery pack is controlled. In this manner, the battery temperature rise is correctly detected so that the battery pack can be fully charged without being damaged.

6 Claims, 14 Drawing Sheets

1 : Battery pack
101~124 : Modules

7 : Battery temperature sensor
8 : Air temperature sensor

CHARGE CONTROL APPARATUS FOR BATTERY PACK WHICH USES RATE OF CHANGE OF BATTERY TEMPERATURE ADJUSTED BY CORRECTION FACTOR

BACKGROUND OF THE INVENTION

1. Field of the Invention

The present invention relates to an apparatus for controlling charging of a storage battery, which is in the form of a battery pack consisting of an assembly of sealed-type nickel-metal hydride batteries or the like, particularly of a storage battery which is to be installed in a movable body such as an electric vehicle.

2. Description of the Prior Art

Conventionally, in controlling charging of a secondary battery which is represented by a nickel-cadmium storage battery, attention is paid to characteristics of a storage battery, such that a voltage of the battery rises as a charge process proceeds and lowers after the time when it reaches the peak value at the full charge, and, when a voltage reduction (what is called $-\Delta V$) of a predetermined amount from the peak value is detected, a control such as stop of charge is conducted.

On the other hand, attention is recently given to a sealed-type nickel-metal hydride battery having a capacity which is very much larger than that of a nickel-cadmium storage battery or the like. The sealed-type nickel-metal hydride battery has noticeable properties that a battery temperature rapidly rises in a period when the charge is approximately completed. Therefore, it is a potent control method that a rapid rising of the battery temperature is detected to thereby make a control to stop charging. For example, Japanese patent publication (Kokai) No. HEI 5-111185 discloses a charge control apparatus which detects a rapid temperature rise and makes a judgment that the charge reaches the final stage.

A sealed-type nickel-metal hydride battery is excellent in fundamental properties such as an energy density, an output density and a life cycle and is under development for practical use as a power source of a movable body such as an electric vehicle. When such a battery is to be used in an electric vehicle, a battery capacity and a total voltage are required to be 50 to 120 Ah and about 100 to 350 V, respectively, in order to obtain a predetermined output. In a nickel-metal hydride battery, since an output voltage of one cell which is the minimum unit in a practical use is about 1.2 V, a number of cells are to be connected in series to one another so as to obtain a required total voltage. For example, when 10 cells are connected in series to constitute 1 module and 24 modules are connected in series, a battery pack of 240 cells is formed and a total voltage of 288 V is obtained. When an assembly of such a large number of cells is to be compactly installed in an electric vehicle or the like, the cells are inevitably arranged in jam-packed. In an arrangement in which cells are jammed with no spatial gap between them, however, a heat radiation property is impaired. Then, a countermeasure such as formation of ribs (projections) on an outer face of a cell container is taken so that cells can make contact with each other while allowing air to pass through therebetween.

FIG. 14 is a diagram showing the basic configuration of a forced cooling apparatus for a battery pack 1 which is to be installed in an electric vehicle. In the figure, the battery pack 1 is provided in a portion through which spaces formed by partition walls 11a and 11b in a container 11 are communicated with each other. Air introduced into the container 11 by an intake fan 12 is exhausted to the outside of the container 11 by an exhaust fan 13 in such a manner that air passes through gaps between the cells and the modules inside the battery pack 1. In this way, the battery pack 1 is forcedly cooled.

In a process of charging the battery pack 1 disposed as described above, even when the control of the charge is to be conducted upon detection of a rise change of the battery temperature as described above while maintaining an air amount for cooling at a constant level, it is not easy to accurately detect the rise change. This is caused by a phenomenon that a cooling rate of the battery varies depending on a temperature difference between the cooling air and the battery.

As described above, since a special storage battery or a battery pack in which a very large number of unit batteries (cells) are densely arranged requires the forced air cooling, it is difficult to adequately carry out the charge control even when only a rising change in the battery temperature is detected. An inadequate control of the charge causes problems that undercharge may impair the battery performance, and that a delay of stop of the charge causes the battery to generate a large amount of heat to increase the internal pressure of each cell, resulting in danger of explosion, etc.

OBJECT AND SUMMARY OF THE INVENTION

The present invention has been conducted in order to solve the above-mentioned problems, and it is an object of the invention to offer a charge control apparatus for a battery pack which can correctly detect a temperature rise of a battery pack charged under a condition of forced air-cooled, and stably carry out a full charge of the battery.

In order to attain the above-mentioned object, the charge control apparatus for a battery pack according to the present invention is a charge control apparatus for a battery pack consisting of a series assembly of a plurality of battery modules which are to be charged under a condition of forced air-cooled, the apparatus comprising: a battery temperature sensor for detecting a battery temperature of at least one of the battery modules; an air temperature sensor for detecting an air temperature of an air of outside the battery modules; temperature measuring means for measuring the battery temperature and the air temperature based on outputs of the battery temperature sensor and the air temperature sensor; correction means for adding a correction amount based on a difference between the battery temperature and the air temperature to an amount of charge of the battery temperature per unit time, to obtain a rate of change of the battery temperature; and rate-of-change judging means for generating an output which controls the charge of the battery pack when the rate of change exceeds a predetermined value.

In the thus composed charge control apparatus for a battery pack, the battery temperature and the air temperature are measured on the basis of the outputs of the battery temperature sensor and the air temperature sensor; a correction amount based on the difference between the battery temperature and the air temperature is added to the amount of change of the battery temperature per unit time, thereby obtaining the rate of change of the battery temperature; and, when the rate of change exceeds the predetermined value, the charge of the battery pack is controlled. Consequently, the predetermined charge state in the final stage of the charge can be correctly detected so that a full charge of the battery is stably conducted.

Temperature difference judging means for executing judgment on the difference between the battery temperature and the air temperature may be provided; and, when the absolute value of the difference between the battery temperature and the air temperature is greater than a predetermined value, the charge may be controlled to be stopped; and thereby, the battery pack is prevented from being subjected to an inadequate charge caused by an error of the correction.

Air-temperature upper-limit judging means for executing judgment on an upper limit of the air temperature may be provided; and, when the air temperature is equal to or higher than a predetermined value, the charge may be controlled to be stopped; and thereby the battery pack is prevented from being subjected to an inadequate charge caused by an error of the correction.

Air temperature change judging means for executing judgment on an amount of change of the air temperature per unit time may be provided; and, when the amount of change of the air temperature per unit time is greater than a predetermined value, the judgment on the amount of change of the battery temperature may be suppressed so that the charge control based thereon is not conducted. This configuration prevents stop of charging caused at an inadequate time by an error of the correction.

Elapsed time judging means for executing judgment on a lapse of time from the start of the charge may be provided; and the judgment on the rate of change of the battery temperature may be suppressed until the time elapsed from the start of the charge reaches a predetermined time; and thereby an initial peak which may be generated in the initial stage of the charge is not erroneously detected as a temperature rise in the final stage of the charge, thereby inhibiting occurrence of an erroneous operation of the charge control apparatus.

The charge control apparatus for a battery pack according to another embodiment of the present invention is composed so that: battery temperature sensors are provided in a portion of excellent heat radiation and a portion of inferior heat radiation, respectively; and a battery temperature and an air temperature are measured on the basis of either of outputs of first and second battery temperature sensors, and also an output of an air temperature sensor; and there is provided sensor selecting means for selectively outputting, on the basis of the air temperature, one of outputs of the first and second battery temperature sensors which is to be used in a temperature measurement. In this configuration, in accordance with a level of the air temperature, the sensor selecting means selects one of the outputs of the first and second battery temperature sensors which is to be used in the temperature measurement, and therefore the temperature of an adequate portion can be detected in compliance with the state of the air temperature.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 5 is replaced with a hardware configuration.

FIG. 5 is replaced with a hardware configuration.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereinafter, preferred embodiments of the invention will be described with reference to the accompanying drawings.

(Embodiment 1)

Figure 1:
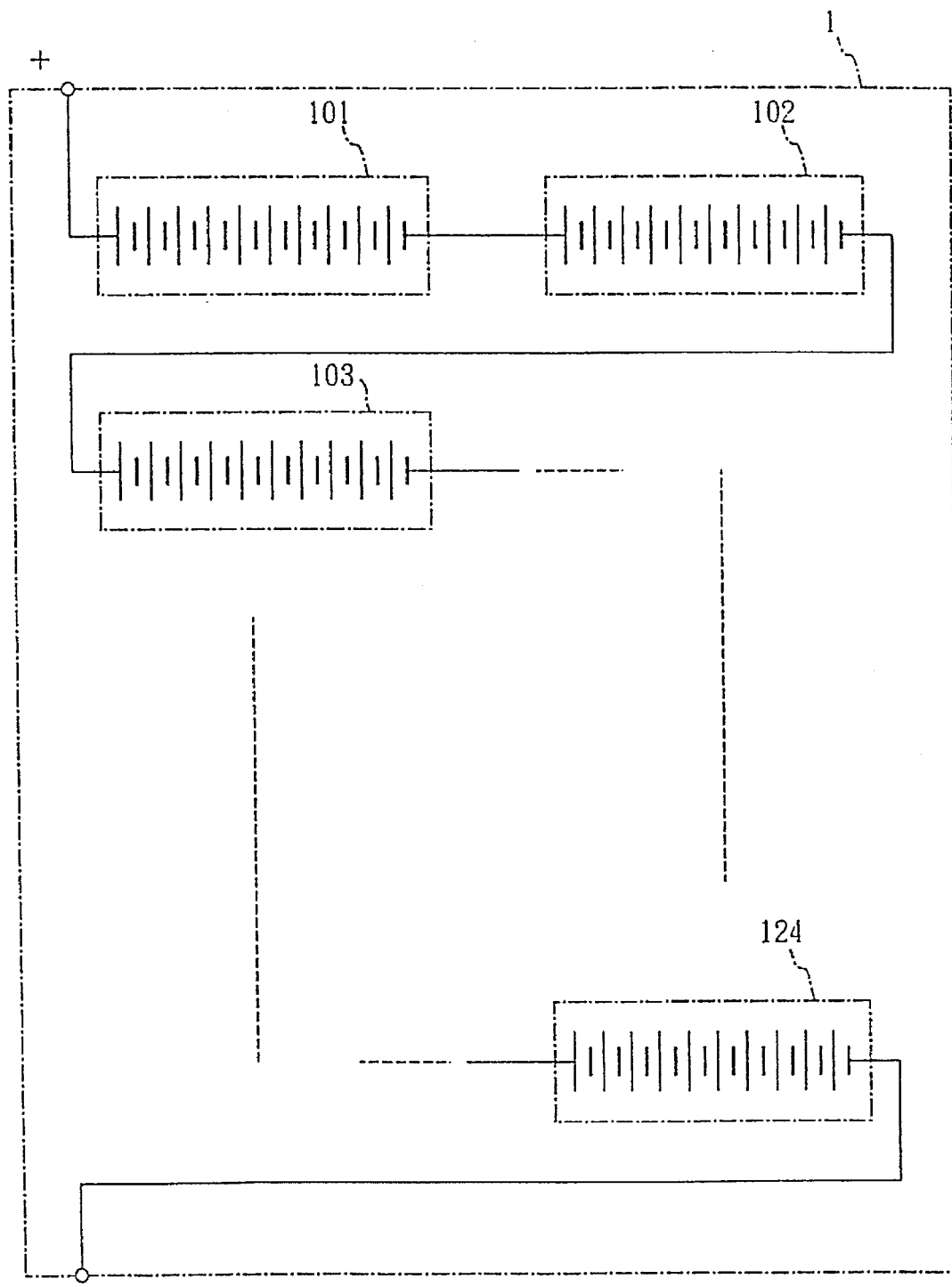
FIG. 1 is a diagram showing an internal circuit configuration of a battery pack.

FIG. 1 is an internal circuit diagram of a storage battery which is to be installed in a movable body such as an electric vehicle and consists of an assembly of sealed-type nickel-metal hydride batteries. The battery (pack) 1 is a battery pack in which a plurality (in the embodiment, for example, 24) of modules 101, 102, 103, . . . , and 124 are connected in series, and each of the modules consists of a series assembly of a plurality (usually, 10) of cells.

Figure 2:
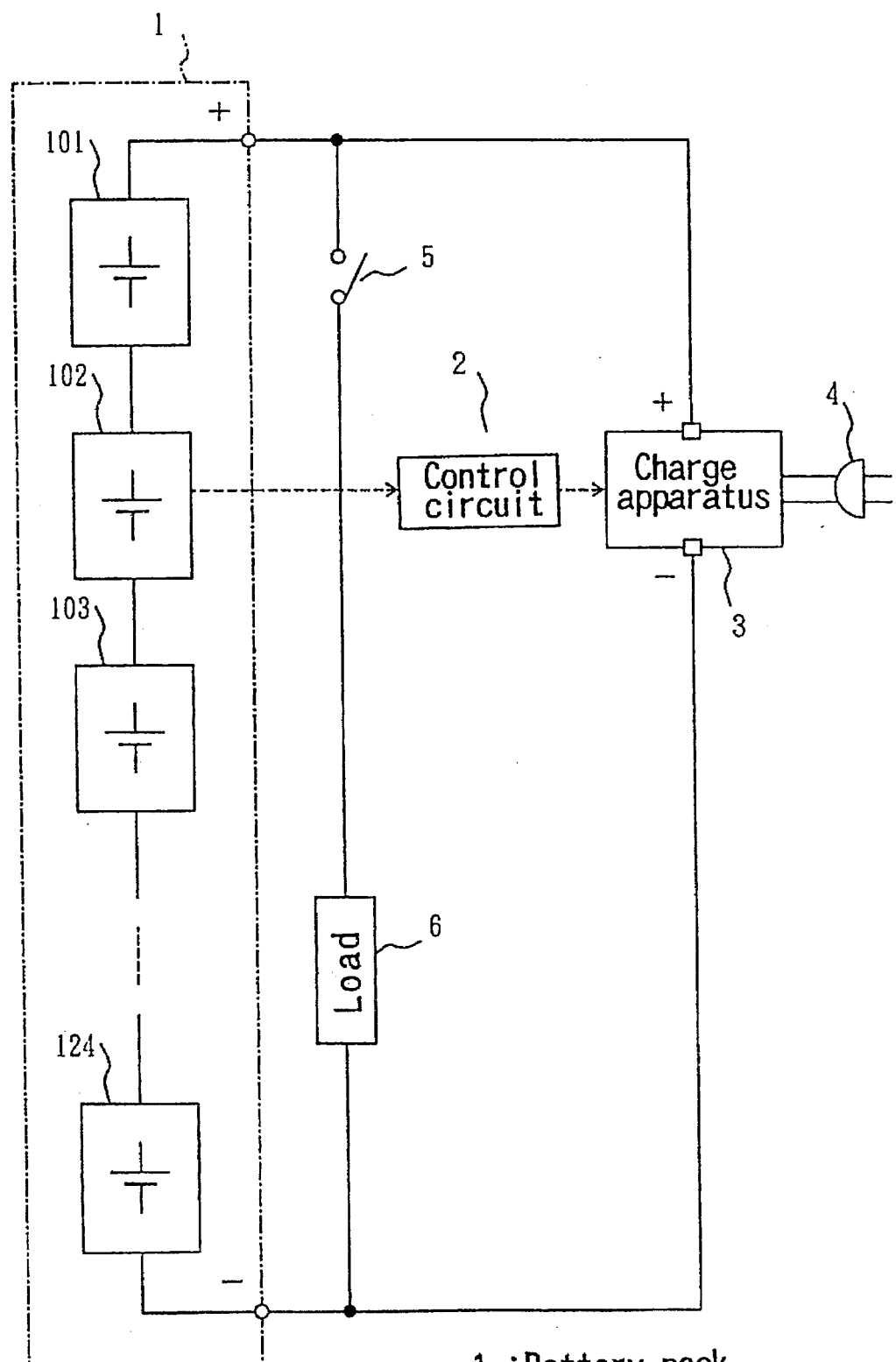
FIG. 2 is a circuit diagram showing an outline configuration of a charge control apparatus for a battery pack in the present invention.

FIG. 2 is a circuit diagram showing a charge control apparatus for the battery pack 1 shown in FIG. 1. A charge apparatus 3, and a series circuit of a switch 5 and a load 6 is connected across the battery pack 1. The load 6 is a motor, etc. of an electric vehicle or the like. Under a normal running state, the switch 5 is closed so that a current is supplied to the load. During a charge, the switch 5 is opened to isolate the load from the battery pack, and a DC charge voltage is applied to the battery pack by the charge apparatus 3. A plug 4 of the charge apparatus is connected to a power source of, for example, AC 200 V. In response to a signal from a control circuit 2, the charge apparatus 3 makes a charge control. The control circuit 2 receives a temperature data signal from the battery pack 1. In the illustrated configuration, although the circuit receives the signal from the specific module 102, this is shown as an example for the sake of convenience, and actually, a configuration in which a signal is received from one or more of the modules 101 to 124 is available.

Figure 3:
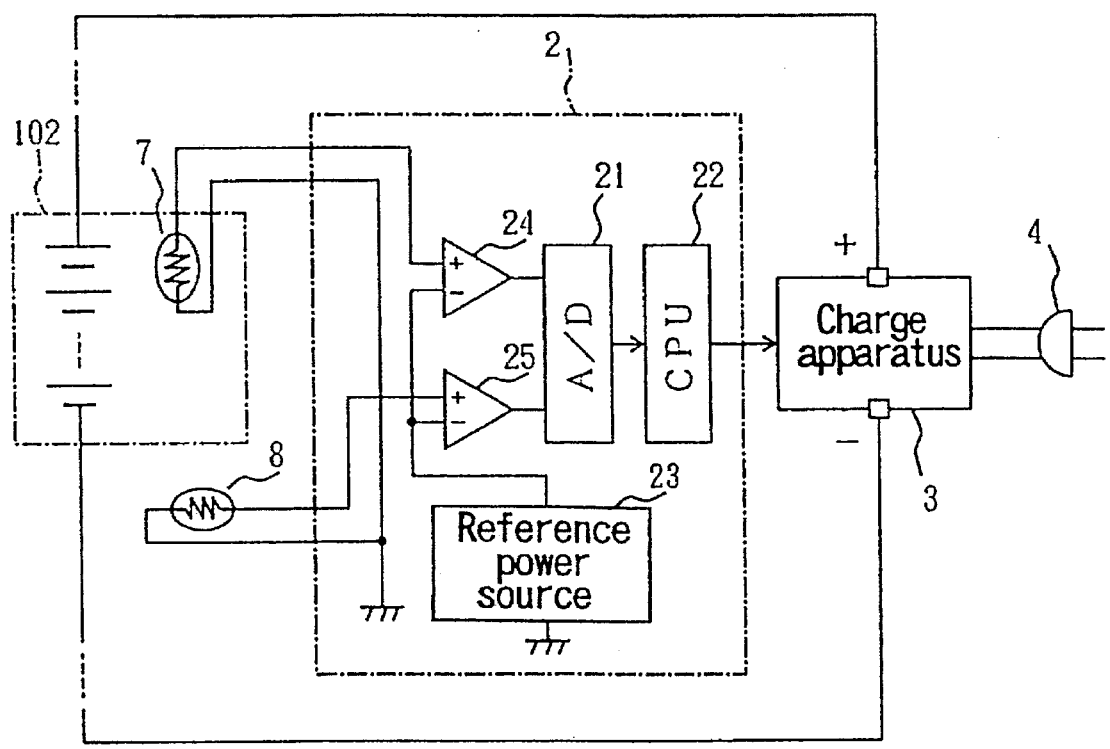
FIG. 3 is a circuit diagram specifically showing the configuration of the charge control apparatus which is schematically shown in FIG. 2.

FIG. 3 is a circuit diagram specifically showing the configuration of the charge control apparatus which is schematically shown in FIG. 2. Referring to FIG. 3, a battery temperature sensor 7 is provided in the module 102, and an output of the sensor is sent to an A/D converter 21 in the control circuit 2 through an operational amplifier 24. An air temperature sensor 8 is provided outside and in the vicinity of the module 102, and an output of the sensor is similarly sent to the A/D converter 21 through an operational amplifier 25. A predetermined voltage is supplied from a reference voltage source 23 to the inverting input terminals of the operational amplifiers 24 and 25. A digital output of the A/D converter 21 is sent to a CPU 22, and the charge apparatus 3 is controlled by an output of the CPU 22. The battery temperature sensor 7 and the air temperature sensor 8 are, for example, thermistor temperature sensors. In the embodiment, although the battery temperature sensor 7 is provided in one specific cell, alternatively, a sensor may be provided in a plurality of cells as required, and the CPU 22 may obtain the maximum value of outputs or a mean value of outputs.

Next operation of the embodiment will be described with reference to the flow chart of FIG. 4. At first, the switch 5 of FIG. 2 is opened to isolate the load 6 from the battery pack, and the charge apparatus 3 is activated to start the charge. When the charge is started, the charge apparatus 3 supplies the battery pack 1 with a charge current of a constant power of 5 to 6 kW. On the other hand, in FIG. 3, the battery temperature sensor 7 and the air temperature sensor 8 always detect the battery temperature and the air temperature, and issue instantaneous values of them in the form of voltage. These outputs are input through the A/D converter 21 to the CPU 22 as instantaneous temperature data. The CPU 22 repeatedly reads the instantaneous temperature data in a predetermined period and calculates mean values of the data to set them as battery temperature data $T_B$ and air temperature data $T_A$, respectively (step 101). The temperature measurement in step 101 is illustrated in detail as a subroutine in FIG. 5.

Figure 4:
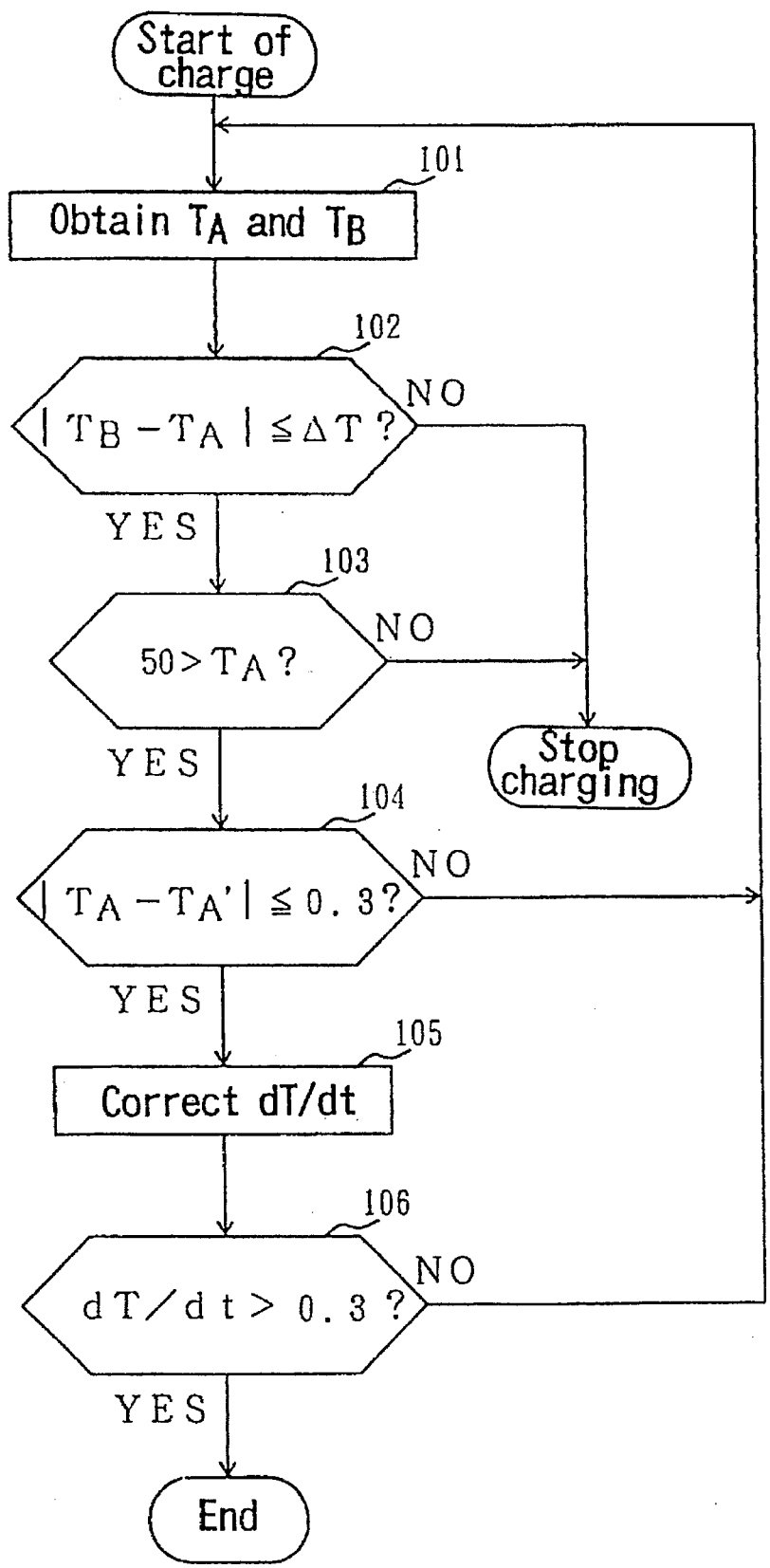
FIG. 4 is a flow chart which is to be executed by a CPU 22 of FIG. 3.
Figure 5:
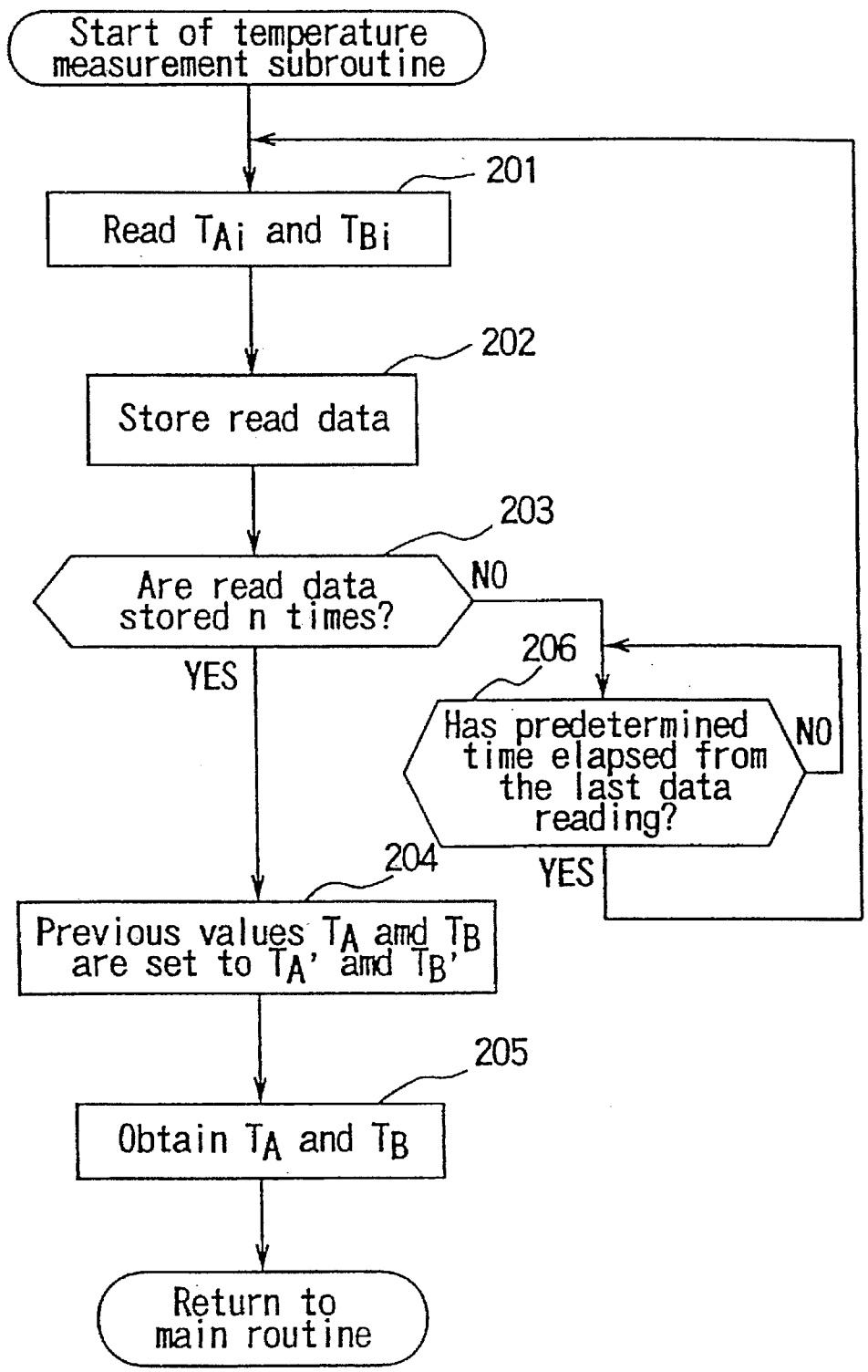
FIG. 5 shows a subroutine which is a part of the flow chart of FIG. 4.

Referring to FIG. 5, when the temperature measurement subroutine is started, the CPU 22 (FIG. 3) reads in step 201 instantaneous data $T_{Ai}$ of the air temperature and instantaneous data $T_{Bi}$ of the battery temperature. Next, in step 202, the read data of the respective temperatures are stored. Next, it is judged in step 203 whether read data have been stored n times or not. In the embodiment, for example, n is 6. Initially, data are stored in step 202 for the first time, and therefore there are only one data for reading. Therefore, the process proceeds to step 206 and it is judged whether a predetermined time has elapsed from the last data reading (i.e., the execution of step 201) or not. In the embodiment, for example, the predetermined time is set to be 10 seconds. When the predetermined time has elapsed in step 206, the process returns to step 201, and instantaneous data $T_{Ai}$ of the air temperature and instantaneous data $T_{Bi}$ of the battery temperature are again read. In this way, steps 201 to 206 are repeated, so that data for n times readings are collected. Namely, when the above-mentioned number is applied, instantaneous data $T_{Ai}$ of the air temperature and instantaneous data $T_{Bi}$ of the battery temperature are read every 10 seconds, and data for 6 times readings in total have been collected at the instance when one minute has elapsed. The process then proceeds to step 204. In step 204, the air temperature data $T_A$ and the battery temperature data $T_B$ which have been already stored are stored as previous data $T_A'$ and $T_B'$, respectively. Initially, however, there is no stored data, and therefore both the previous data are set to be 0. In step 205, thereafter, the air temperature data $T_A$ and the battery temperature data $T_B$ are newly obtained. In the embodiment, the air temperature data $T_A$ and the battery temperature data $T_B$ are obtained as mean values of collected instantaneous data $T_A$ and data $T_B$ for n times readings, respectively. Thus, the latest air temperature data $T_A$ and battery temperature data $T_B$ are obtained, and thereafter the process returns to the main routine (FIG. 4).

Next it is judged in step 102 of FIG. 4 whether an absolute value of the difference between the air temperature data $T_A$ and the battery temperature data $T_B$ is equal to or smaller than a predetermined value $\Delta T$ or not. When $\Delta T$ is 20, for example, this means that it is judged whether the absolute value of the difference between the air temperature and the battery temperature is within 20° C. or not. If the absolute value is not equal to and smaller than the predetermined value $\Delta T$, a signal is immediately sent to the charge apparatus 3 (FIG. 3) to stop charging. This is conducted because, when there is a very large difference between the air temperature and the battery temperature, accuracy of the correction in step 105 which will be described later is impaired. When the accuracy of the correction is impaired, there may arise a case of overcharge or undercharge.

Next it is judged in step 103 whether the air temperature data $T_A$ is smaller than 50 or not. In other words, it is judged whether the air temperature is lower than 50° C. or not. If the temperature is equal to or higher than 50° C., a signal is immediately sent to the charge apparatus 3 (FIG. 3) to stop charging. This is conducted because, when the air temperature reaches 50° C. or higher, an accuracy of the correction in step 105 which will be described later is impaired, and the charge control cannot be executed anymore in an optimum manner.

Next it is judged in step 104 whether an absolute value of the difference between the latest air temperature data $T_A$ and the previous air temperature data $T_A$7 is equal to or smaller than 0.3 or not. In other words, a judgment is made on a mean air temperature of the six measurements for a period of the last one minute continuing to the present in a respect whether the amount of change of the mean air temperature with respect to the similar mean air temperature for the further previous one minute is within 0.3° C. or not. If the amount of change is not within 0.3° C., the process returns to step 101 and the temperature measurement is again executed. This is conducted because, when there occurs a rapid environmental change in which a change of the air temperature in one minute exceeds 0.3° C., an accuracy of the correction in step 105 which will be described later is impaired, and the charge control cannot be executed anymore in an optimum manner. If the amount of change is within 0.3° C., the process proceeds to step 105.

Next, in step 105, dT/dt which is a temporal differential value of the battery temperature (a rate of change of the battery temperature) is obtained. As shown in the following expression (1), the dT/dt is obtained not by applying ($T_B - T_B'$) as it is which is a change of the battery temperature data in one minute, but by applying an operation of adding a predetermined correction amount to it:

$$dT/dt = (T_B - T_B') + (T_B - T_A) \times Kr \qquad (1),$$

where $(T_B - T_A) \times Kr$ is a correction amount. Kr is a specific heat radiation constant based on a structure and material of the battery. The heat radiation constant Kr is previously obtained in the following manner.

Figure 6:
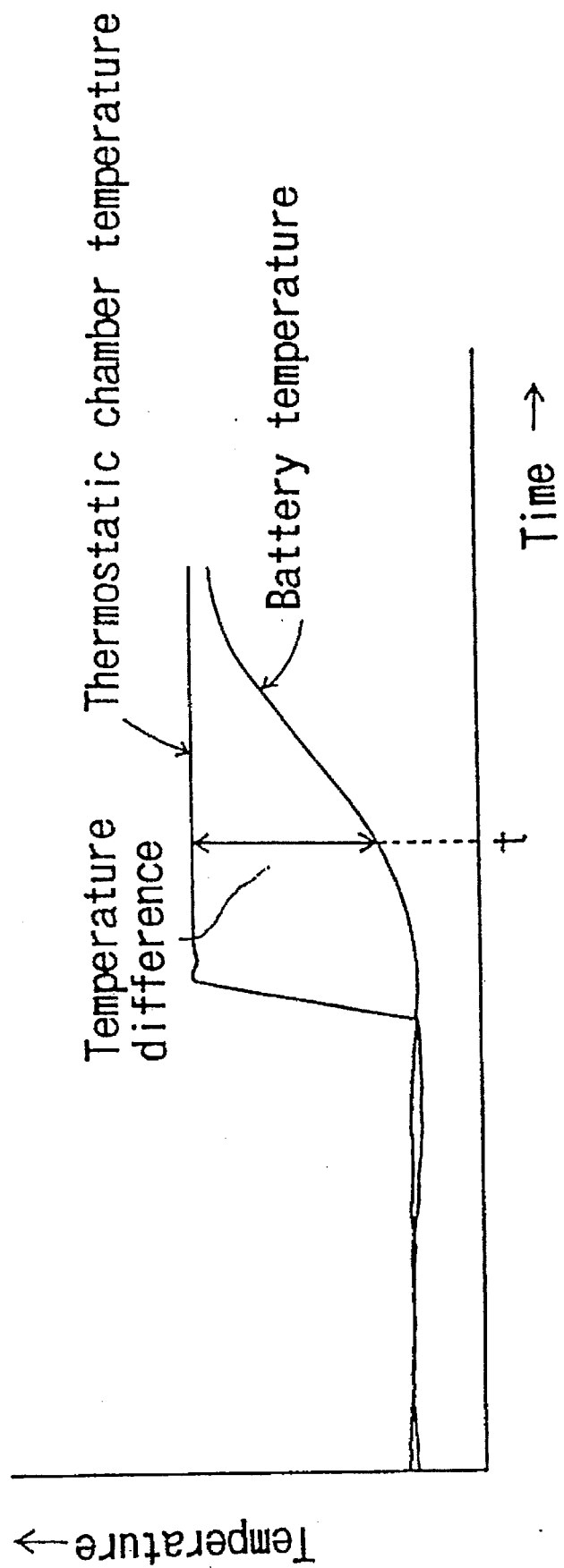
FIG. 6 is a graph showing a change of a battery temperature together with a temperature of a thermostatic chamber in the case where a heat radiation constant which is used in a correction calculation in the invention is to be obtained.

First, a sample module which is the same as the modules 101 to 124 (FIG. 2) is allowed to stand for 6 hours in a thermostatic chamber which is set to be −20° C. Thereafter, the set temperature of the thermostatic chamber is changed to 20° C. An accompanying change of the battery temperature during this period is recorded by a recorder or the like so that the temperature rise curve such as shown in FIG. 6 is obtained. From a temperature difference Tr [deg.] between the thermostatic chamber temperature and the battery temperature at a point of the temperature rise curve at an arbitrary time t, and a rate of change $\Delta T_{Br}$ [deg./min.] of the battery temperature, the ratio $\Delta T_{Br}/Tr$ [deg./deg.·min.] is obtained. The ratio has a substantially constant value irrespective of the time t. Therefore, the ratio is set as the heat radiation constant Kr:

$$Kr=\Delta T_{Br}/Tr \qquad (2).$$

It was ascertained that, in a case such as where the charge is carried out immediately after the running of an electric vehicle, the correction amount in the second term of the right side of the above-mentioned expression (1) becomes too large by a large difference between the battery temperature and the air temperature. In that case, therefore, it is impossible to adequately control the charge. To comply with this, the charge is stopped as described in step 102 of FIG. 4.

Furthermore, it was ascertained that, when the air temperature is 50° C. or higher, the correction amount becomes inadequate. Also in that case, therefore, it is impossible to adequately control the charge. To comply with this, the charge is stopped as described in step 103 of FIG. 4.

Furthermore, it was ascertained that, when the absolute value of a change of the air temperature in one minute exceeds 0.3° C., the correction amount becomes inadequate. Also in that case, therefore, it is impossible to adequately control the charge. To comply with this, as described in step 104 of FIG. 4, the process returns to the temperature measurement, and then proceeds to next step 105 after the change of the air temperature becomes within 0.3° C.

Next, it is judged in step 106 whether a value of dT/dt is greater than 0.3 or not. If the value is not greater than 0.3, the process returns to step 101 to continue the temperature measurement. If the value of dT/dt is greater than 0.3, a predetermined charge control is executed, and the charge control based on the temperature is terminated. The predetermined charge control includes various controls such as that in which the charge is immediately ended, and that in which the process is transferred to a stage where an additional charge of a predetermined amount is further executed.

Figure 7:
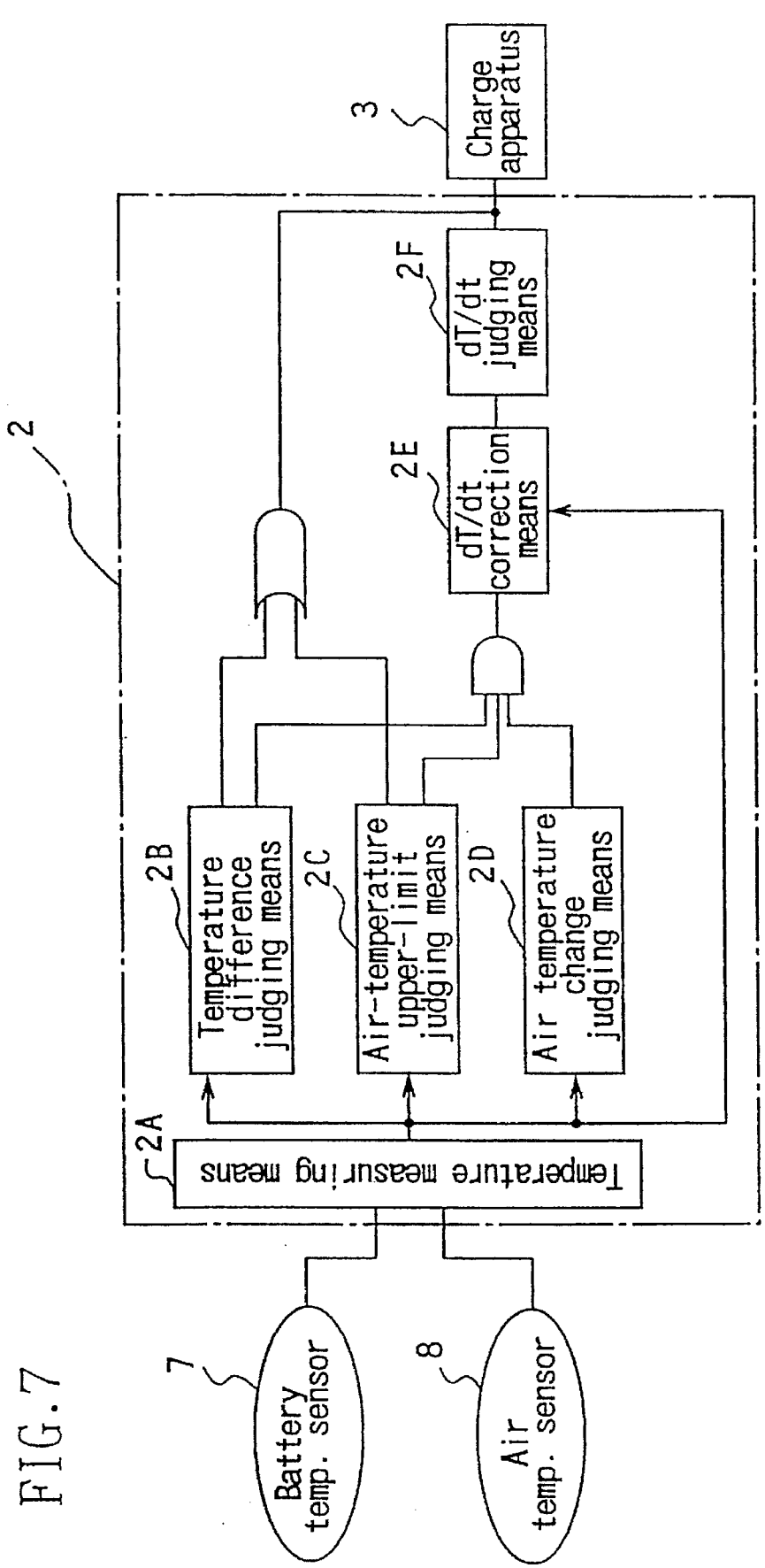
FIG. 7 shows a charge control apparatus in the form in which the configuration mainly consisting of software shown in the flow charts of FIG. 4

FIG. 7 shows a charge control apparatus in the form in which the configuration mainly consisting of software in the CPU in the embodiment is replaced with a hardware configuration. The portions corresponding to those of FIG. 2 and FIG. 3 are designated by the same reference numerals. In FIG. 7, temperature measuring means 2A receives a temperature signal from each of the battery temperature sensor 7 and the air temperature sensor 8 and measures the temperatures. Signals of the measured temperatures are supplied to temperature difference judging means 2B, air-temperature upper-limit judging means 2C, air temperature change judging means 2D, and dT/dt correction means 2E. When a judgment output of at least one of the temperature difference judging means 2B and the air-temperature upper-limit judging means 2C indicates the negation of the continuation of the charge, a charge stop signal is sent to the charge apparatus 3. When all the outputs of the temperature difference judging means 2B, the air-temperature upper-limit judging means 2C, and the air temperature change judging means 2D satisfy predetermined conditions, a signal is sent to the dT/dt correction means 2E, and the dT/dt correction means 2E corrects dT/dt on the basis of an output of the temperature measuring means 2A. The corrected dT/dt is sent to dT/dt judging means 2E (sic) which produces an output based on the comparison with a predetermined value. In response to the output of the dT/dt judging means 2E (sic), the charge apparatus 3 stops charging.

(Embodiment 2)

Figure 8:
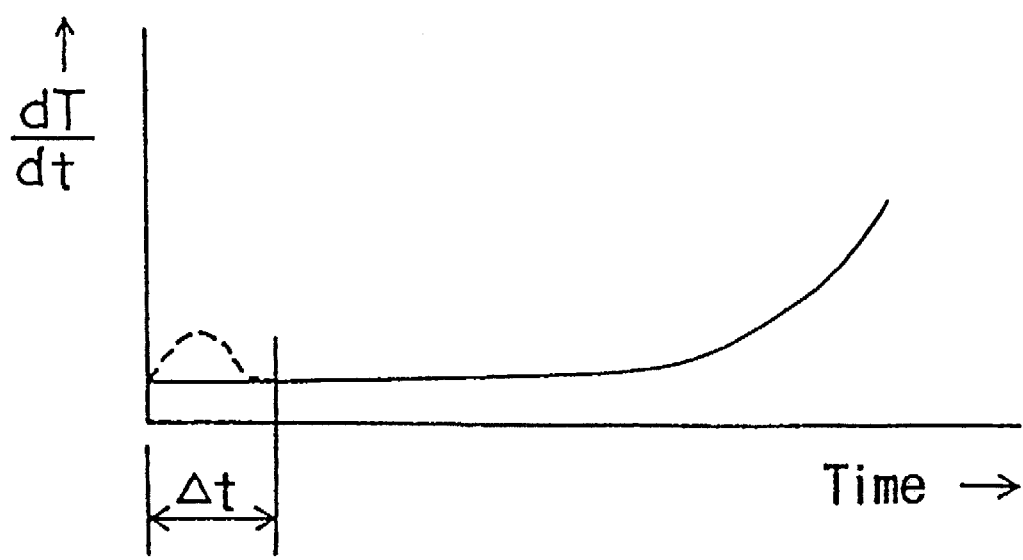
FIG. 8 is a graph showing dT/dt characteristics of a battery pack which is being charged.

Next Embodiment 2 will be described. FIG. 8 is a graph showing a dT/dt curve of the battery pack 1 (FIG. 2) which is being charged. Usually, in a fresh battery pack which has been subjected to a small number of charging and discharging cycles, the dT/dt value changes on a curve indicated by a solid line in FIG. 8. Specifically, dT/dt does not largely change in a period from the initial stage of the charge and the intermediate stage and rapidly changes in the final stage. In contrast, it has been empirically known that, in a battery pack of a large number of cycles, the dT/dt value rises in the initial stage of the charge and after a while lowers as indicated by a broken line in the figure or there is what is called an initial peak. In the configuration of Embodiment 1, there is a possibility that the initial peak in the initial stage of the charge is erroneously detected as a rise of the dT/dt value in the final stage of the charge. In a configuration of this embodiment, the erroneous detection can be avoided.

Figure 9:
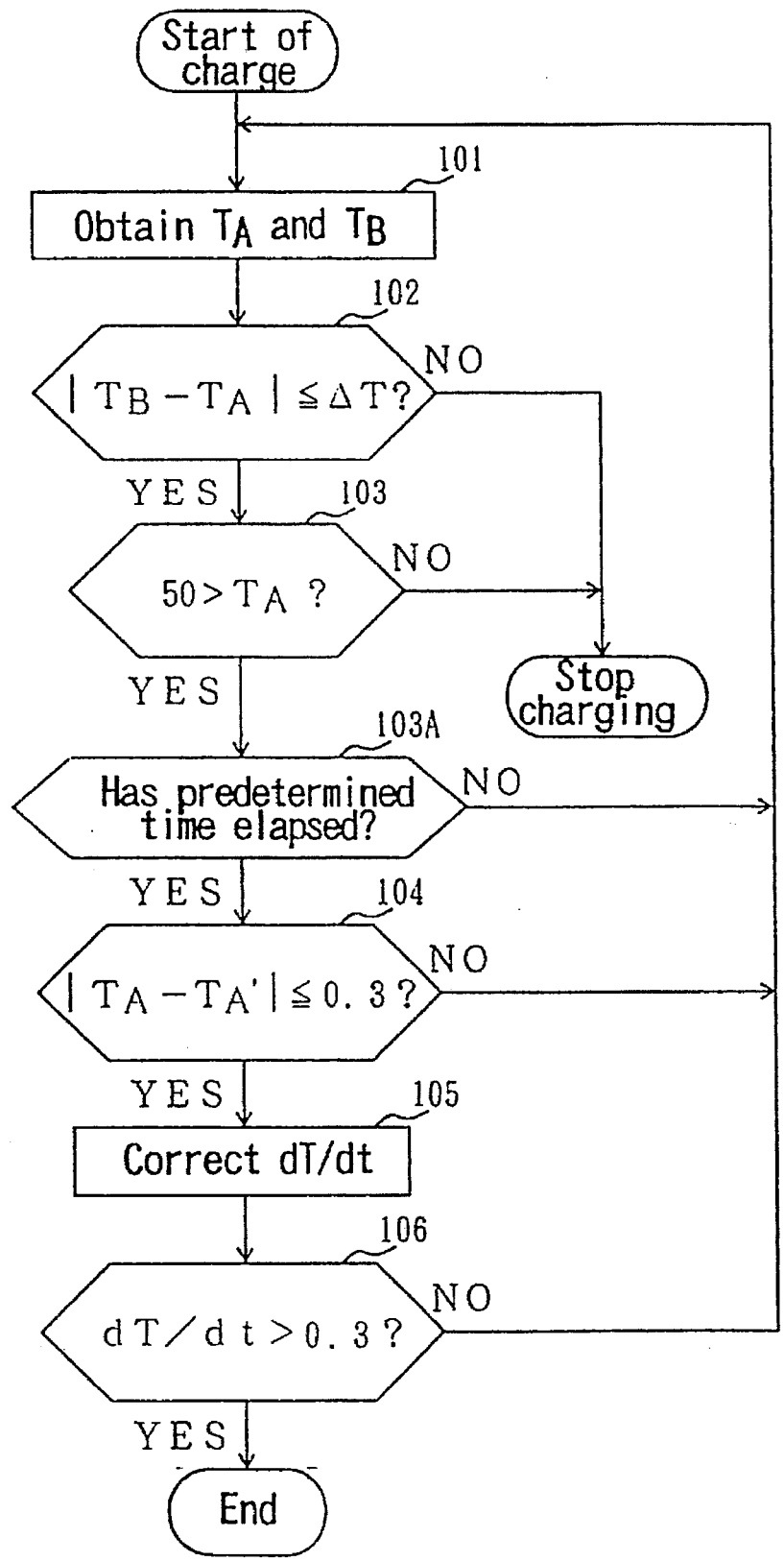
FIG. 9 is a flow chart of Embodiment 2 of the present invention.

In the embodiment, the configuration, etc. shown in FIG. 1 to FIG. 3 and FIG. 5 are the same as those of Embodiment 1. Therefore, their description is omitted and only portions which are different from Embodiment 1 will be described. FIG. 9 is a flow chart of this embodiment. The flow chart is different from that of FIG. 4 in that step 103A is inserted between steps 103 and 104. Namely, in step 103A of FIG. 9, it is judged whether a time period elapsed from the start of the charge reaches a predetermined time or not. In the embodiment, the predetermined time corresponds to the time Δt of FIG. 8 when an initial peak appears, and usually has a value of 5 to 30 minutes. If, in step 103 of FIG. 9, the time period elapsed from the start of the charge has not yet reached the predetermined time, the operation that the process returns to step 101 to execute the temperature measurement is repeated. If the time period elapsed from the start of the charge reaches the predetermined time, the process can proceed to step 104.

According to this configuration, the judgment of the dT/dt value is not executed during a period when an initial peak may appear, and it is therefore prevented to erroneously stop charging when an initial peak is detected as an arrival at the final stage.

Figure 10:
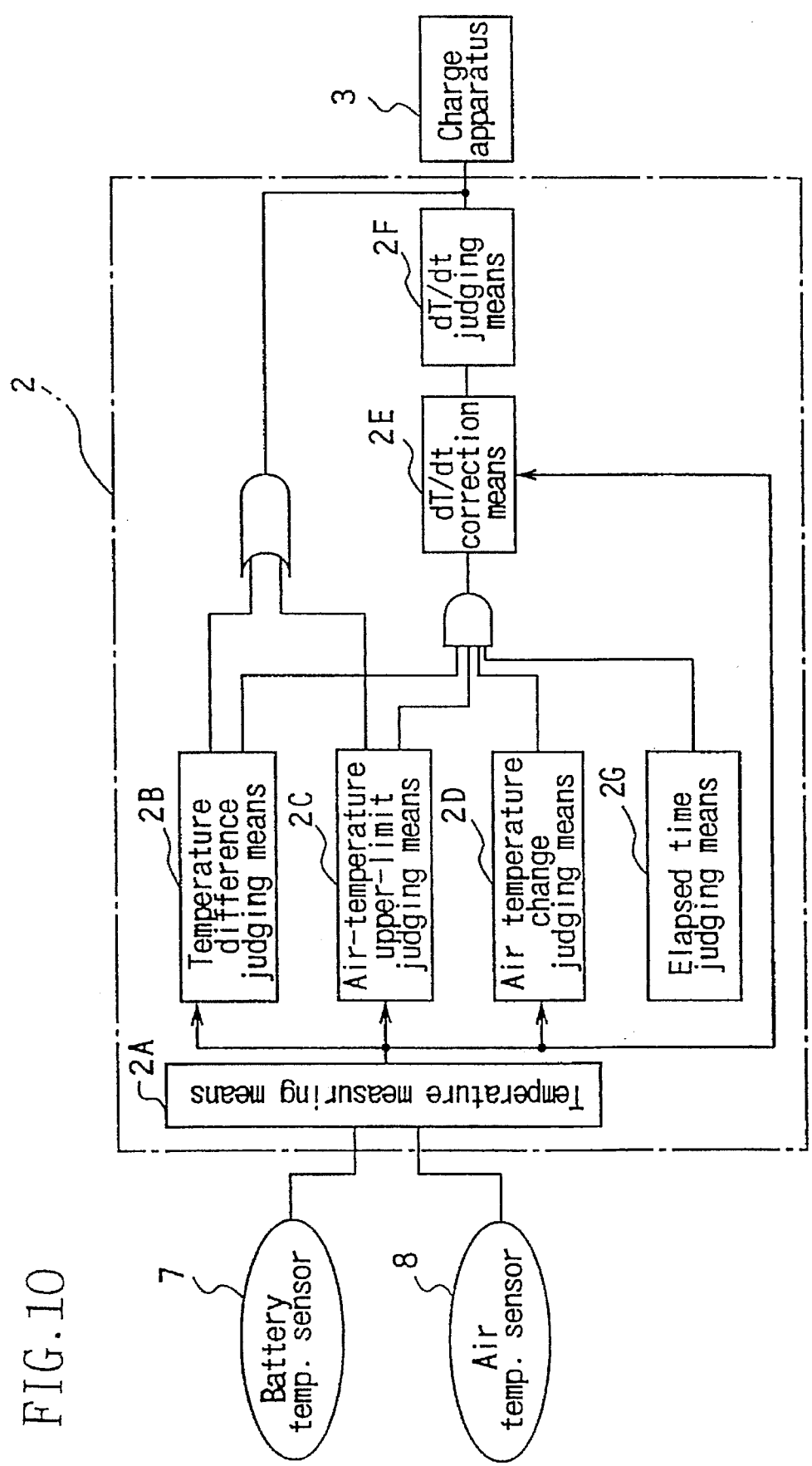
FIG. 10 shows a charge control apparatus in the form in which the configuration of Embodiment 2 mainly consisting of software shown in the flow charts of FIG. 9

FIG. 10 shows a charge control apparatus in the form in which the configuration of Embodiment 2 mainly consisting of software in the CPU 22 is replaced with a hardware configuration. The configuration of FIG. 10 is different from that of FIG. 7 in that: elapsed time judging means 2G for executing judgment on a lapse of time from the start of the charge is provided; and the output of the means is added to the AND logic for operating the dT/dt correcting means 2E.

(Embodiment 3)

Figure 11:
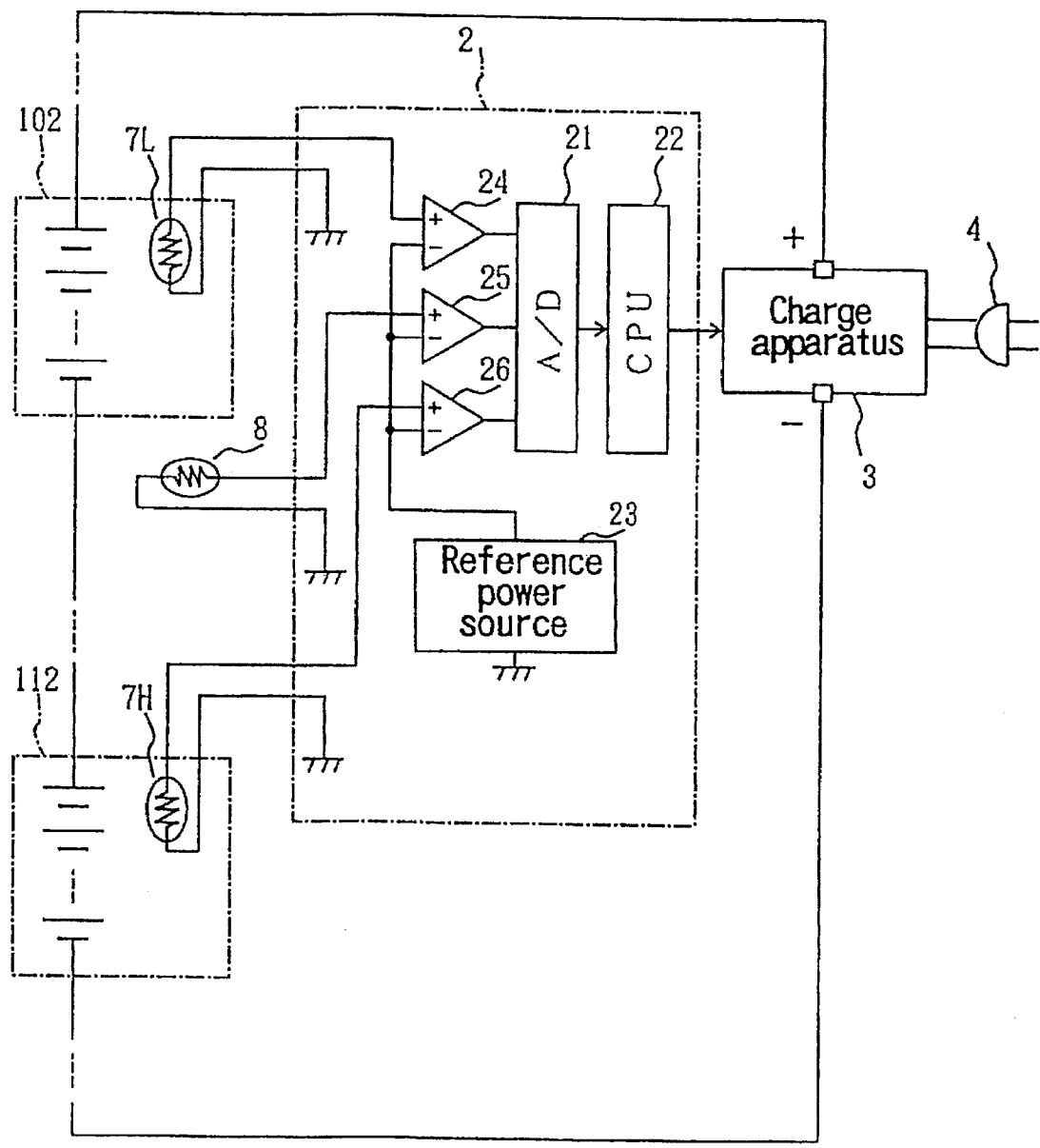
FIG. 11 is a circuit diagram showing the configuration of Embodiment 3 of the present invention.

Next, Embodiment 3 will be described. With respect to the configuration etc. shown in FIG. 1, FIG. 2, and FIG. 4 of Embodiment 1, the configuration of Embodiment 3 are the same as those of Embodiment 1, and therefore their description is omitted and only portions which are different from Embodiment 1 will be described. FIG. 11 is a circuit diagram showing a configuration of this embodiment. FIG.

12 is a flow chart showing a temperature measurement subroutine in the embodiment. Referring to FIG. 11, a battery temperature sensor 7L is provided in the module 102, and an output of the sensor is sent to the A/D converter 21 through the operational amplifier 24 in the control circuit 2. The air temperature sensor 8 is provided outside and in the vicinity of the module 102, and the output of the sensor is similarly sent to the A/D converter 21 through the operational amplifier 25. A battery temperature sensor 7H is provided in another module 112, and an output of the sensor is sent to the A/D converter 21 through an operational amplifier 26 in the control circuit 2. A predetermined voltage is supplied from the reference voltage source 23 to inverting input terminals of the operational amplifiers 24 to 26.

In the embodiment, the battery temperature sensors are disposed at two positions in consideration of the fact that, depending on the arrangement of the modules in the battery pack 1 (FIG. 2), there are modules (and cells) which radiates heat easily and modules (and cells) which radiates heat hardly. For example, the module disposed in the center of the battery pack 1 radiates heat hardly, and the cell disposed in the center of the module radiates heat most hardly. In contrast, a module disposed in the peripheral area radiates heat easily, and the cell disposed in the outer end portion of the module radiates heat most easily. It is assumed that: in FIG. 11, the module 102 radiates heat easily; the module 112 is a module which radiates heat hardly; the battery temperature sensor 7L is disposed in the cell which radiates heat most easily among the cells of the module 102; and the battery temperature sensor 7H is disposed in the cell which radiates heat most hardly among the cells of the module 112.

In charging the battery pack 1, it is generally known that, when the air temperature is low, an internal pressure of the cell of the most excellent heat radiation property rises faster, and, when the air temperature is high, the internal pressure of the cell of the most inferior heat radiation property rises faster. Therefore, to prevent the internal pressure from being excessively raised, it is preferable to measure the temperature of the cell of the most excellent heat radiation property when the air temperature is low, and the temperature of the cell of the most inferior heat radiation property when the air temperature is high. The embodiment is composed in view of this point.

Figure 12:
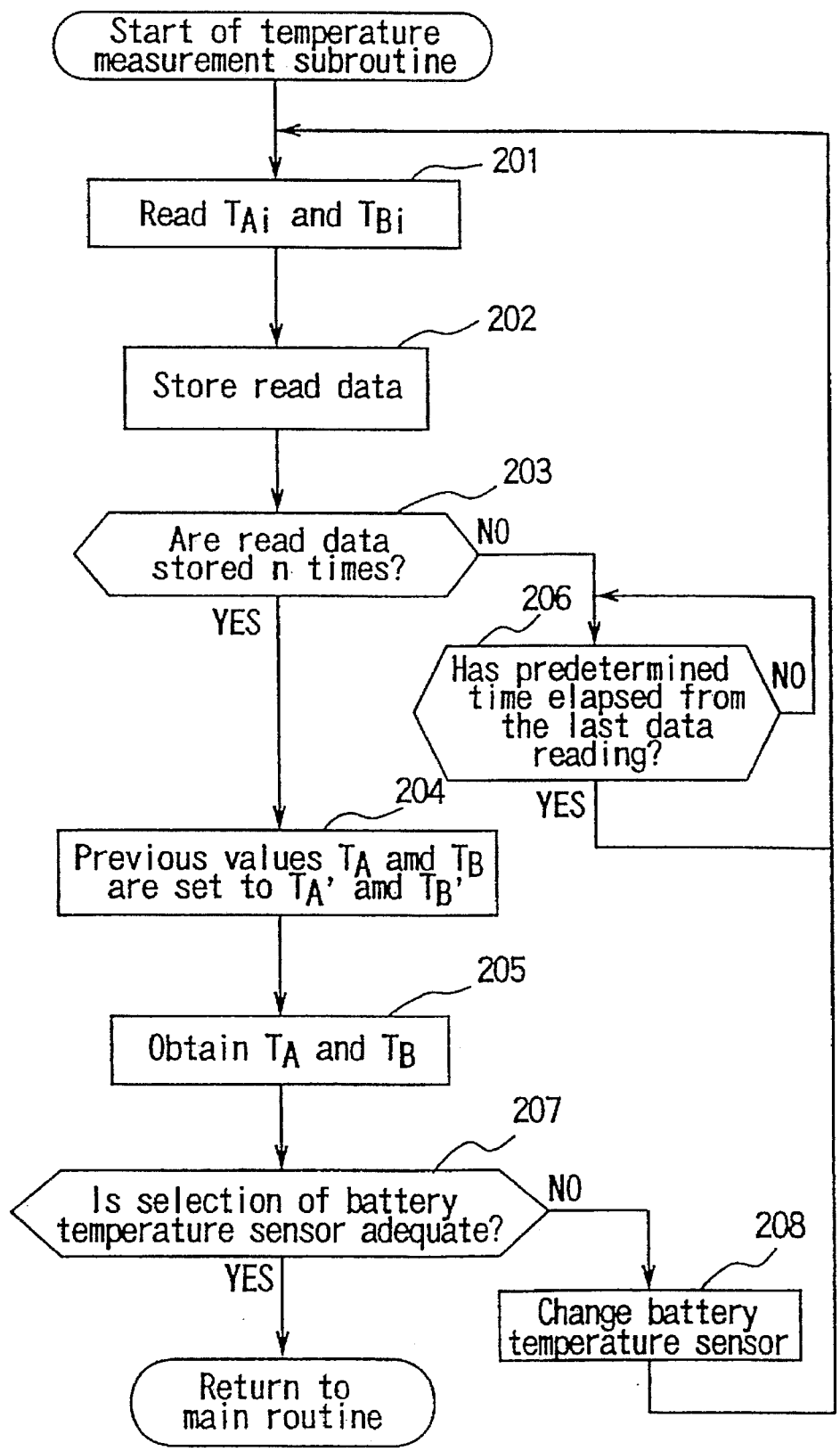
FIG. 12 shows a temperature measurement subroutine of a flow chart of Embodiment 3.

Next the temperature measurement subroutine of the embodiment will be described with reference to the flow chart of FIG. 12. The main routine is the same as the flow chart shown in FIG. 4. In step 201 of FIG. 12, the CPU 22 (FIG. 11) reads instantaneous data $T_{Ai}$ of the air temperature and instantaneous data $T_{Bi}$ of the battery temperature from the output of either of the battery temperature sensors 7L and 7H. For example, it is assumed that the CPU is previously set so as to read at first and without exception instantaneous data $T_{Ai}$ of the air temperature and instantaneous data $T_{Bi}$ of the battery temperature from the output of the battery temperature sensor 7L. Thereafter, steps 201 to 203 and 206 are repeated, and then steps 204 and 205 are executed. The operation in these steps is the same as that of Embodiment 1, and its description is omitted. Next, it is judged in step 207 whether the selection of the battery temperature sensor 7L is adequate or not. Specifically, it is judged whether the air temperature $T_A$ obtained in step 205 is higher or lower than a predetermined temperature. If the air temperature is higher, judgment is NO, and, if the air temperature is lower, judgment is YES. In other words, the battery temperature sensor 7L which is provisionally selected at first is attached to the module 102 of the excellent heat radiation property, and therefore it is a sensor which is to be selected at a low temperature. Consequently, when the air temperature is low, the selection is adequate, and, when the air temperature is high, the selection is inadequate. If the selection is inadequate, charge-over is executed in step 208 so as to select the battery temperature sensor 7H, and values which have been already measured are reset, and the process returns to step 201 so that the temperature measurement is again executed. Thereafter, when the process again proceeds to step 207, the selection is now adequate, and therefore the process returns to the main routine (FIG. 4).

When an object of the temperature measurement is switched in accordance with the air temperature as described above, it is possible to prevent the internal pressure of the cells from being excessively raised and adequately control the charge.

Figure 13:
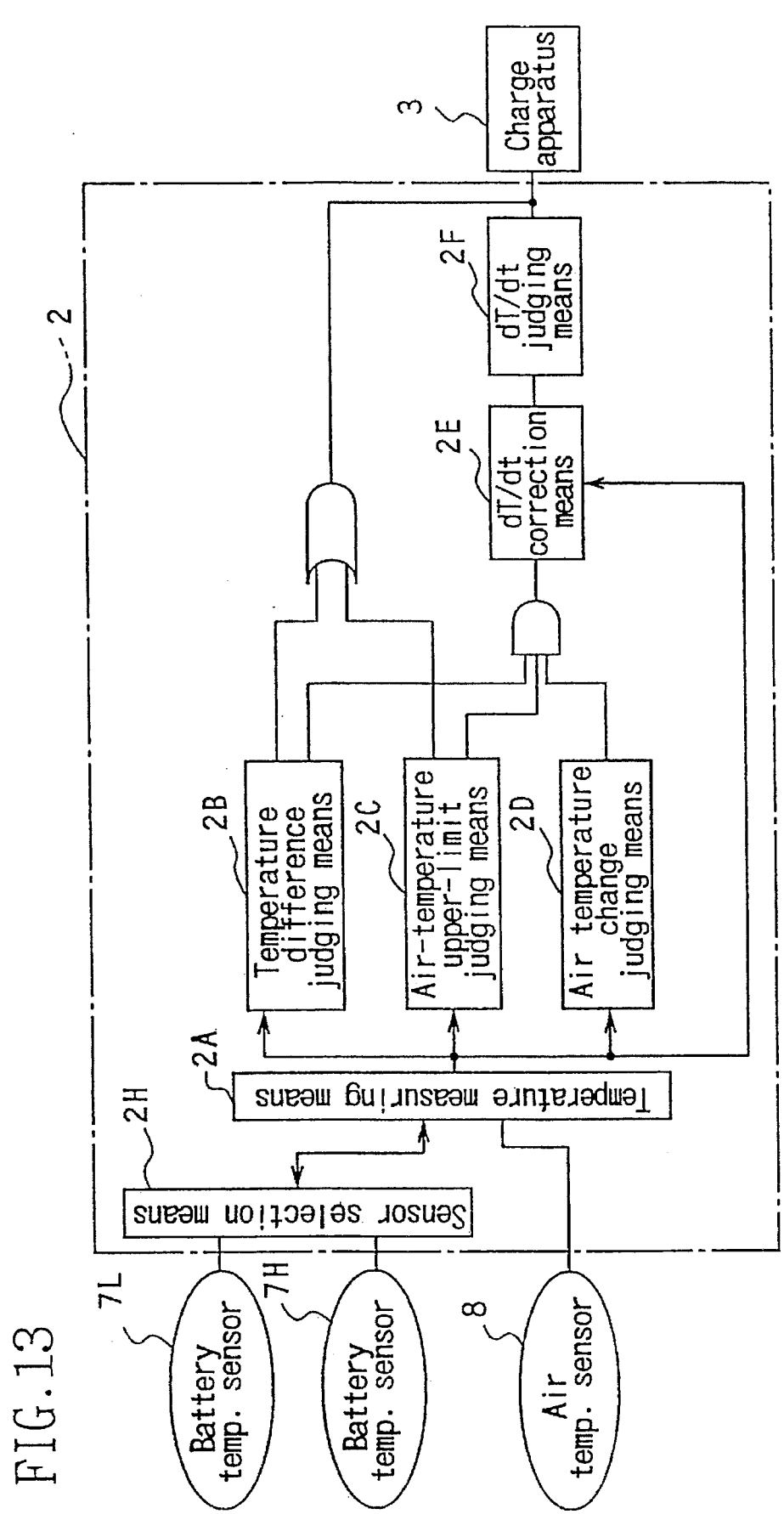
FIG. 13 shows a charge control apparatus in the form in which the configuration of Embodiment 3 shown in FIG. 11 and the configuration mainly consisting of software shown in the flow charts of FIG. 4 and FIG. 12 are replaced with a hardware configuration.
Figure 14:
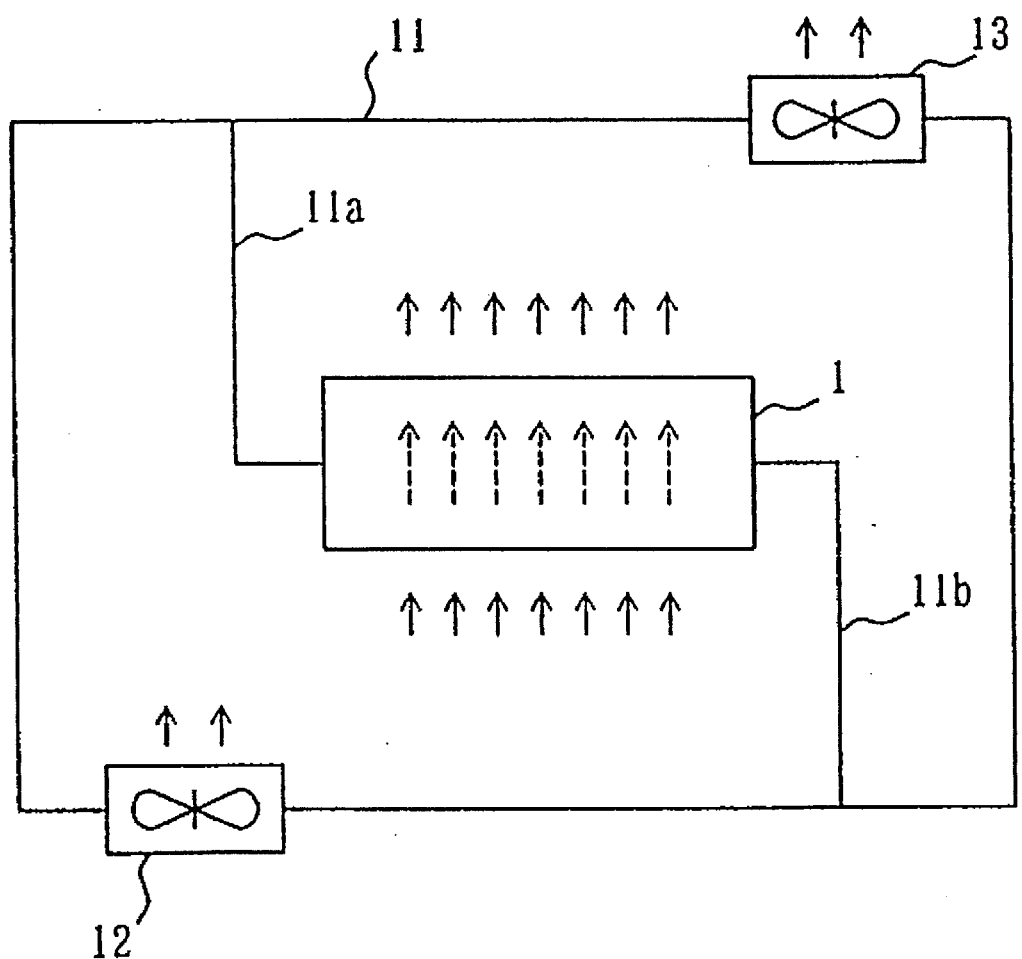
FIG. 14 is a diagram showing a basic configuration of a forced cooling apparatus for a battery pack 1.

FIG. 13 shows a charge control apparatus in the form in which the configuration mainly consisting of software in the CPU 22 in Embodiment 3 is replaced with a hardware configuration. The apparatus is different from that of FIG. 7 in that: the battery temperature sensors 7L and 7H are provided; and sensor selecting means 2H for selecting one of their outputs and outputting the selected output is provided.

In the above-mentioned embodiments, although the charge control is dependent on only the detection of the battery temperature and the air temperature, it is a matter of course that the known charge control based on a voltage, etc. may be combined.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A charge control apparatus for a battery pack, the battery pack comprising a series assembly of a plurality of battery modules which are charged while being cooled by passing forced air therethrough, said apparatus comprising:

a battery temperature sensor for detecting a battery temperature of at least one of said battery modules;

an air temperature sensor for detecting an air temperature of air exhausted from said battery modules by the forced air cooling process;

temperature measuring means for measuring the battery temperature and the air temperature based on outputs of said battery temperature sensor and said air temperature sensor;

correction means for adding a correction amount based on a difference between the battery temperature and the air temperature to an amount of change of the battery temperature per unit time, to obtain a rate of change of the battery temperature;

rate-of-change judging means for generating a predetermined output when the rate of change exceeds a first predetermined value; and a charge apparatus which receives said predetermined output and controls charging of said battery pack.

2. A charge control apparatus for a battery pack according to claim 1, wherein said apparatus further comprises temperature difference judging means for generating an output to stop said charge apparatus when an absolute value of a difference between the battery temperature and the air temperature is greater than a second predetermined value.

3. A charge control apparatus for a battery pack according to claim 1, wherein said apparatus further comprises air-temperature upper-limit judging means for generating an output to stop said charge apparatus when the air temperature is equal to or higher than a third predetermined value.

4. A charge control apparatus for a battery pack according to claim 1, wherein said apparatus further comprises air temperature change judging means for generating an output to stop said charge apparatus when an amount of change of the air temperature per unit time is greater than a fourth predetermined value.

5. A charge control apparatus for a battery pack according to claim 1, wherein said apparatus further comprises elapsed time judging means for suppressing an operation of said correction means and said rate-of-change judging means until a lapse of time from a start of charging reaches a predetermined time.

6. A charge control apparatus for a battery pack, the battery pack comprising a series assembly of a plurality of battery modules which are charged while being cooled by passing forced air therethrough, said apparatus comprising:

a first battery temperature sensor for detecting a battery temperature of at least one of said battery modules which does not easily radiate heat in said battery pack;

a second battery temperature sensor for detecting a battery temperature of at least one of said battery modules which easily radiates heat in said battery pack;

an air temperature sensor for detecting an air temperature of air exhausted from said battery modules by the forced air cooling process;

temperature measuring means for measuring the battery temperature and the air temperature based on at least one of outputs of said first and second battery temperature sensors and an output of said air temperature sensor;

sensor selection means for selectively outputting, on the basis of the air temperature, one of the outputs of said first and second battery temperature sensors, said selected output being supplied to said temperature measuring means;

correction means for adding a correction amount based on a difference between the battery temperature and the air temperature to an amount of change of the battery temperature per unit time, to obtain a rate of change of the battery temperature;

rate-of-change judging means for generating a predetermined output when the rate of change exceeds a predetermined value; and a charge apparatus which receives said predetermined output and controls charging of said battery pack.

* * * * *